United States Patent
Yang et al.

(10) Patent No.: US 7,564,749 B2
(45) Date of Patent: Jul. 21, 2009

(54) INTERFACE DEVICE FOR OPTICAL RECORDING AND/OR REPRODUCING APPARATUS

(75) Inventors: Jak Heun Yang, Suwon-si (KR); Yong Hoon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 689 days.

(21) Appl. No.: 11/297,366

(22) Filed: Dec. 9, 2005

(65) Prior Publication Data

US 2006/0280054 A1 Dec. 14, 2006

(30) Foreign Application Priority Data

May 26, 2005 (KR) .................. 10-2005-0044659

(51) Int. Cl.
*G11B 7/00* (2006.01)
(52) U.S. Cl. ................ 369/47.2; 369/47.15; 369/53.22; 369/44.41
(58) Field of Classification Search ........... None
See application file for complete search history.

(56) References Cited

U.S. PATENT DOCUMENTS

| | | | |
|---|---|---|---|
| 5,721,717 A * | 2/1998 | Obata et al. ............. | 369/44.27 |
| 5,742,575 A | 4/1998 | Yamakawa et al. | |
| 2003/0002552 A1 | 1/2003 | Nagara | |
| 2003/0076770 A1 | 4/2003 | Hashimoto | |
| 2004/0052174 A1 | 3/2004 | Hayashi et al. | |

FOREIGN PATENT DOCUMENTS

| | | |
|---|---|---|
| CN | 1392549 | 1/2003 |
| EP | 0 725 395 A2 | 8/1996 |
| EP | 0 939 397 A2 | 9/1999 |
| EP | 1376 560 A1 | 1/2004 |
| KR | 10-0459708 | 12/2004 |
| WO | WO 2005/038786 A2 | 4/2005 |

OTHER PUBLICATIONS

Search Report issued in European Patent Application No. 05112202.6-2210 on Nov. 27, 2006.

* cited by examiner

*Primary Examiner*—Muhammad N. Edun
(74) *Attorney, Agent, or Firm*—Stein McEwen, LLP

(57) ABSTRACT

An interface device for an optical recording and/or reproducing apparatus for recording and playback of an optical disc, wherein the configuration of an interface circuit between a pickup that reads and writes information from/on the optical disc and a radio frequency (RF) integrated circuit (IC) for signal processing is simplified. To this end, the interface device includes a pickup, an integrated circuit, and a multiplexer. The pickup drives a plurality of laser diodes generating laser signals to record and/or reproduce information on a plurality of discs, respectively, and receives the laser signals reflected from the discs and output photodiode (PD) signals corresponding respectively to the received laser signals. The integrated circuit controls outputs of the laser diodes, and processes the PD signals from the pickup. The multiplexer is disposed in the pickup, and selects a PD signal corresponding to a particular one of the discs from among the PD signals from the pickup and interface the selected particular PD signal to the integrated circuit.

22 Claims, 3 Drawing Sheets

INTERFACE DEVICE FOR OPTICAL RECORDING AND/OR REPRODUCING APPARATUS

CROSS-REFERENCE TO RELATED APPLICATIONS

This application claims the benefit of Korean Patent Application No. 2005-44659, filed on May 26, 2005, in the Korean Intellectual Property Office, the disclosure of which is incorporated herein by reference.

BACKGROUND OF THE INVENTION

1. Field of the Invention

An aspect of the present invention relates to an optical recording and/or reproducing apparatus to record and playback data of an optical disc, and, more particularly, to an interface device of an optical recording and/or reproducing apparatus wherein the configuration of an interface circuit between a pickup that reads and writes information from/on an optical disc and a radio frequency (RF) integrated circuit (IC) for signal processing is simplified.

2. Description of the Related Art

With advances in video and audio media technologies, a recording medium in which high quality video and audio data may be recorded and stored for a lengthy period of time, for example an optical disc like a digital versatile disc (DVD), has been developed and made commercially available. Along with this medium, an optical recording and/or reproducing apparatus which may record and/or reproduce video and audio data on the optical disc, for example, a DVD player, has also been developed and made commercially available.

This optical recording and/or reproducing apparatus reproduces video and/or audio data recorded on the optical disc and outputs the reproduced data via a screen and/or a speaker. The optical recording and/or reproducing apparatus has various advantages over a conventional video and/or audio reproducing apparatus in terms of higher-quality video and/or audio signal reproduction due to a higher signal-to-noise ratio, a lower noise level due to regularities in reproduction and modulation, minimal signal distortion, ghost-free reproduction, and a random access capability. Thus, the optical recording and/or reproducing apparatus has been in a trend towards rapid advances and widespread use.

Various types of optical recording and/or reproducing apparatuses, such as a compact disc player (CDP), a laser disc player (LDP), a compact disc graphic player (CDGP), and a video compact disc player (VCDP), have been developed and used extensively. Recently, DVDs have been developed using moving picture compression techniques such as moving picture experts group 2 (MPEG2), moving picture experts group 4 (MPEG4), and Digital Video EXpress (DivX). A blu-ray disc (BD) and a high definition-DVD (HD-DVD) have also been developed using a blue laser technology. Along with these, DVD players have been developed to record and playback corresponding discs.

As shown in FIG. 1, such an optical recording and/or reproducing apparatus uses a laser diode (LD) which generates a laser signal to read and write information from/on a disc 12, a BD, HD-DVD, DVD, or CD. The LD has input/output characteristics which vary relatively very sensitively with the operating temperature thereof.

That is, the LD requires a different input (typically expressed in an electric current value) depending upon the operating temperature thereof to output a laser signal of a constant power level irrespective of the operating temperature thereof. Thus, there is a need for an Auto laser diode Power Control (APC) technique to optimally control the LD. This APC technique determines the performance of the optical recording and/or reproducing apparatus.

An APC unit 22 using such an APC technique is provided to feed a variation in the output of the LD back to the LD to keep the output of the LD constant. Generally, the APC unit 22 is provided in a radio frequency (RF) integrated circuit (IC) 20 together with an RF signal processor 24. The RF IC 20 is placed on a main printed circuit board (PCB) 30.

On the other hand, an LD driver 14 is provided in a pickup 10 to drive the LD. Thus, the pickup 10 and the main PCB 30 are interconnected via connectors 40 to constitute an interface circuit between the LD driver 14 and the RF IC 20.

As a result, the RF IC 20 has to receive a monitor signal corresponding to an output variation of a monitor photo diode (MPD) attached to the LD through the connectors 40. The LD driver 14 also has to receive a control signal from the RF IC 20 through the connectors 40.

For this reason, where the optical recording and/or reproducing apparatus of FIG. 1 is a universal optical recording and/or reproducing apparatus that is capable of recording and playing back all kinds of discs 12 including a BD, HD-DVD, DVD, and CD, a plurality of LD drivers 14 must be separately provided corresponding respectively to a plurality of LDs configured for recording/playback of the respective discs 12, and have separate outputs corresponding respectively to the LDs. This increases the number of input/output pins of the pickup 10 and RF IC 20 on the main PCB 30, thus making the layout of the PCB and the structures of the connectors 40 complicated, resulting in degradation in signal quality.

Moreover, because a multiplexer (MUX) 26 is provided in the RF IC 20 to multiplex input/output signals of the pickup 10 and RF IC 20, the number of pins of the connectors 40 from the pickup 10 to the RF IC 20 on the main PCB 30 increases, which leads to an obstacle that prevents smallness, lightness, and cost effectiveness of the optical recording and/or reproducing apparatus.

SUMMARY OF THE INVENTION

Therefore, an aspect of the invention provides an interface device for an optical recording and/or reproducing apparatus, wherein a multiplexer is provided in a pickup to multiplex input/output signals of the pickup and an RF IC so that the number of pins of connectors from the pickup to the RF IC is reduced, leading to simplification of PCB layout and preservation of signal quality.

Another aspect of the invention provides an interface device for an optical recording and/or reproducing apparatus which may reduce the size and cost of the optical recording and/or reproducing apparatus by decreasing the number of input/output pins of an RF IC.

In accordance with an aspect of the invention, there is provided an interface device for an optical recording and/or reproducing apparatus comprising: a pickup to drive a plurality of laser diodes generating laser signals to record and/or reproduce information on a plurality of discs, respectively, and to receive the laser signals reflected from the discs and output photodiode (PD) signals corresponding respectively to the received laser signals; an integrated circuit to control outputs of the laser diodes, and to process the PD signals from the pickup; and a multiplexer, disposed in the pickup, to select a PD signal corresponding to a particular one of the discs from among the PD signals from the pickup and interface the selected particular PD signal to the integrated circuit.

According to an embodiment of the invention, the discs may be of different types and the laser diodes may correspond to the discs, respectively. The laser diodes may generate the laser signals depending upon types of the discs, respectively, and the laser signals may correspond to the discs, respectively.

According to another embodiment of the invention, the multiplexer includes a plurality of multiplexing channels which are selectively operated to multiplex output signals of monitor photodiodes (MPDs) attached to the respective laser diodes for the discs to output an output signal of an MPD (MPD signal) corresponding to the particular disc.

The integrated circuit may be a radio frequency (RF) integrated circuit (IC) which converts the particular PD signal among the PD signals from the pickup into a servo control signal and an RF signal necessary to the particular disc and performs a servo control operation and RF data processing operation for the particular disc respectively, according to the converted servo control signal and RF signal.

The particular disc may be any one of a Blu-ray disc (BD), digital versatile disc (DVD), high definition-DVD (HD-DVD), and/or a compact disc (CD).

The RF IC may be provided on a main printed circuit board (PCB) and connected to the pickup through connectors.

A microcomputer may be mounted on the main PCB. The microcomputer may output a switch control signal to the pickup and RF IC to select a desired one of types of the discs corresponding to the particular disc.

In accordance with another aspect of the invention, there is provided an interface device for an optical recording and/or reproducing apparatus comprising: a pickup to record and/or reproduce information on a plurality of discs; a radio frequency (RF) integrated circuit (IC) to perform an RF signal processing operation on the information on the discs; and a multiplexer to select an output signal from the pickup and interface the selected signal to the RF IC.

The multiplexer may be provided in the pickup.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
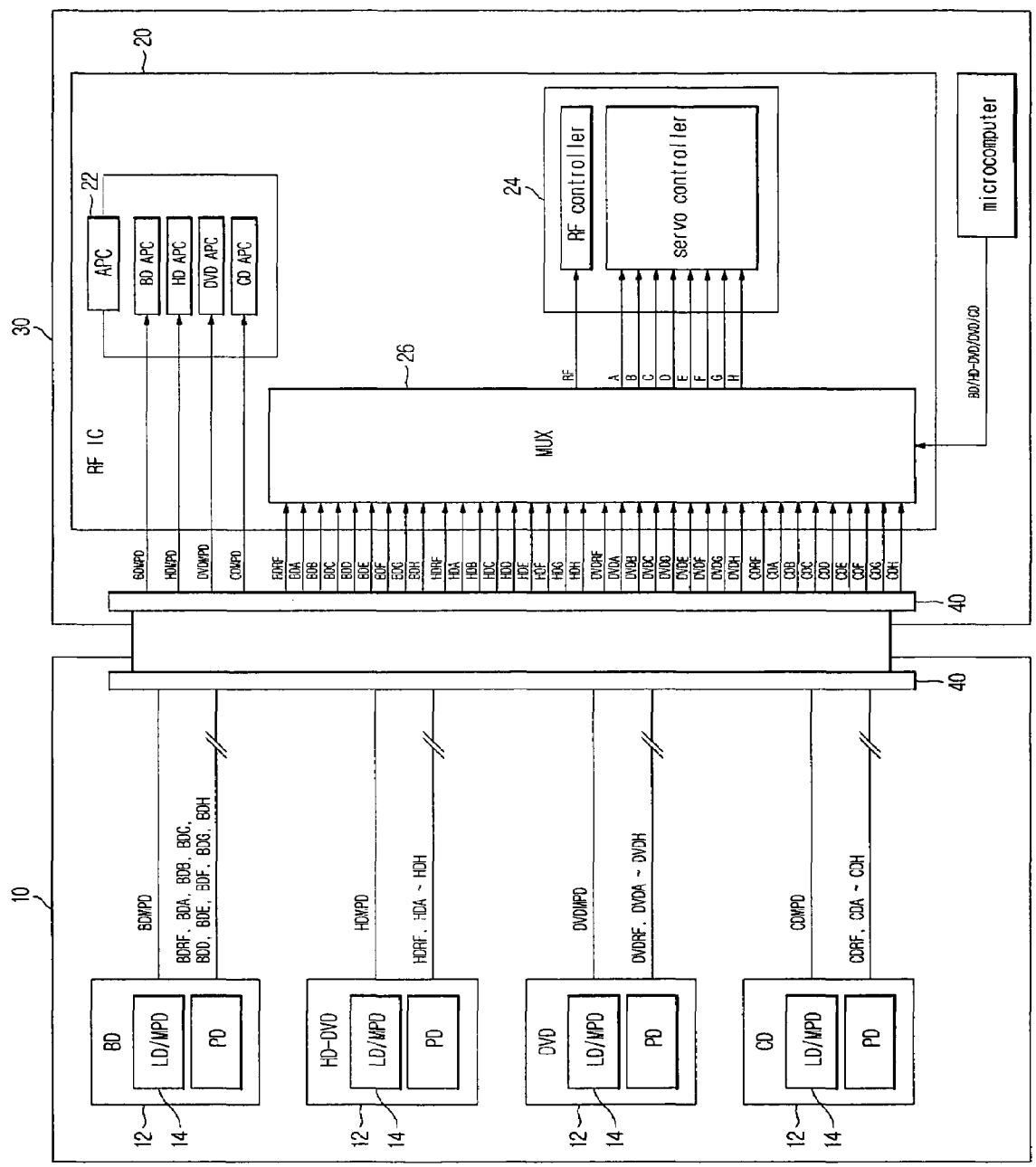
FIG. 1 is a block diagram showing the circuit configuration of an interface device for a conventional optical recording and/or reproducing apparatus.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
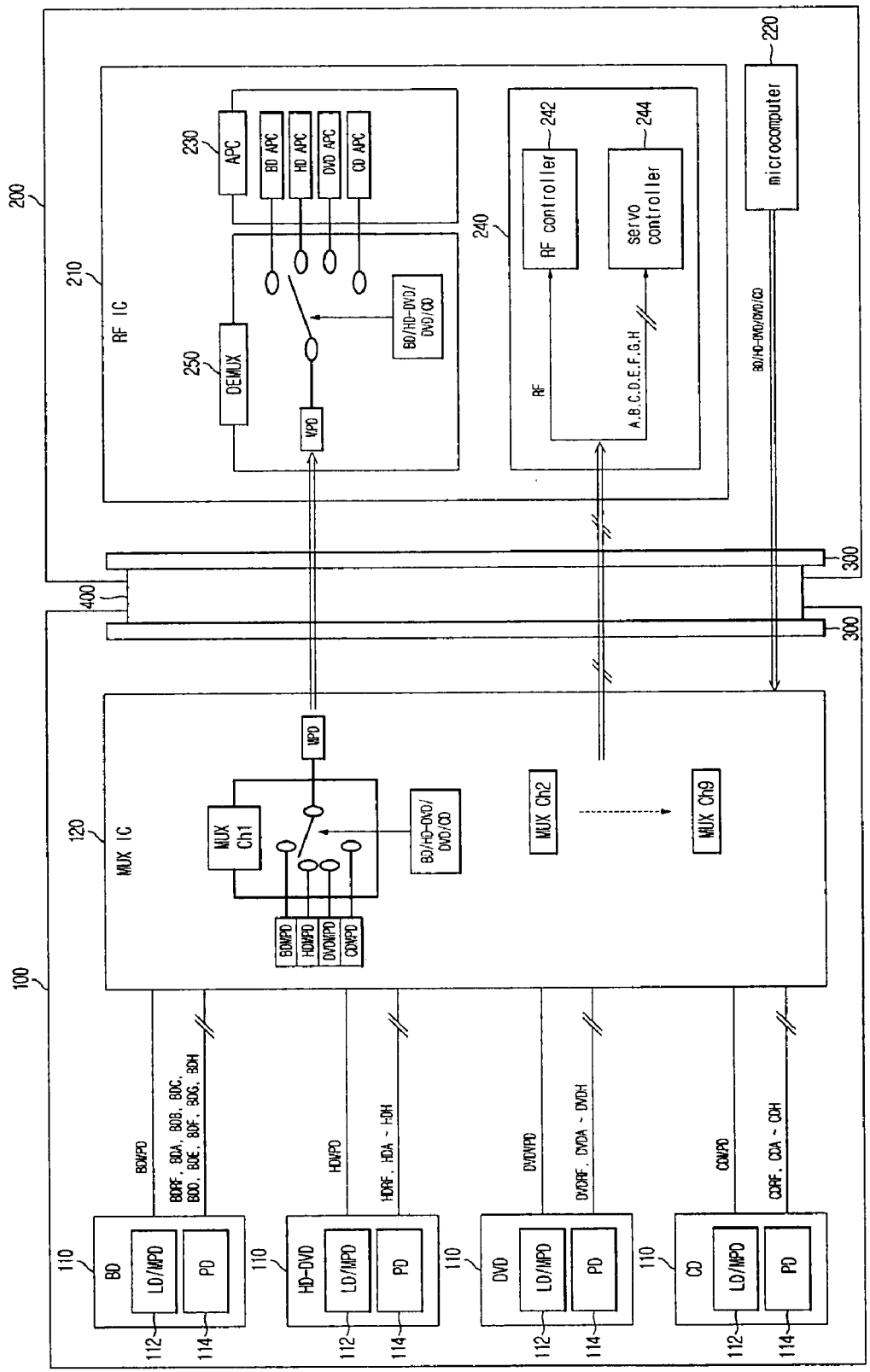
FIG. 2 is a block diagram showing the circuit configuration of an interface device for an optical recording and/or reproducing apparatus according to an embodiment of the present invention.

FIG. 2 is a block diagram showing the circuit configuration of an interface device for an optical recording and/or reproducing apparatus according to an embodiment of the present invention. As shown in FIG. 2, the interface device for the optical recording and/or reproducing apparatus mainly includes a pickup 100 and a main PCB 200. The pickup 100 and the main PCB 200 are connected to each other via a cable 400 through connectors 300.

The pickup 100 is a device to read and write information from/on discs 110, each of which may be a BD, HD-DVD, DVD, and/or CD or another format. The pickup 100 includes laser diode driver units (hereinafter referred to as LD units) 112 to drive laser diodes (LDs) for the respective discs 110, respectively, photo diode (PD) units (hereinafter referred to as PD units) 114 to receive laser signals reflected from the associated discs 110, respectively, and an MUX IC 120 including a plurality of MUX channels Ch1 to Ch9, each of which selects an output signal from a PD unit (PD signal) corresponding to an associated one of the discs 100 from among output signals from the PD units 114 (PD signals) corresponding respectively to the discs 100.

Each of the MUX channels Ch1 to Ch9 in the MUX IC 120 is also adapted to multiplex output signals from monitor photo diodes (hereinafter referred to as MPDs) attached to the respective LDs for the discs 110 to select an output signal from an MPD (MPD signal) corresponding to the associated disc from among the output signals from the MPDs (MPD signals).

The main PCB 200 includes an RF IC 210 for RF signal processing, and a microcomputer 220 which outputs a switch control signal BD/HD-DVD/DVD/CD to the pickup 100 and the RF IC 210 to select a desired one of the types of the discs 110.

The RF IC 210 includes an Auto laser diode Power Control unit (hereinafter referred to as an APC unit) 230 which optimally controls outputs of the LDs for all the types of discs 110 including at least one of a BD, HD-DVD, DVD, and/or CD. The RF IC 210 also includes an RF signal processor 240 which converts a PD signal from the MUX IC 120 into a servo control signal and an RF signal necessary to a particular disc 110 corresponding to the PD signal and performs a servo control operation and an RF data processing operation for the particular disc, respectively, according to the converted servo control signal and RF signal. The RF IC 210 further includes a demultiplexer (DEMUX) 250 which receives an MPD signal corresponding to the particular disc 110 from the MUX IC 120, selects one of a plurality of output terminals thereof corresponding to the particular disc 110 in response to the switch control signal BD/HD-DVD/DVD/CD from the microcomputer 220, and outputs the MPD signal to a corresponding APC of the APC unit 230 through the selected output terminal.

The APC unit 230 optimally controls outputs (amounts of light) of the respective LDs for the discs 110, each of which is at least one of a BD, HD-DVD, DVD, and/or CD. That is, the APC unit 230 keeps the outputs of the LDs constant by feeding variations in the outputs of the LDs back thereto, respectively. To this end, the APC unit 230 includes at least one of a BD APC, HD APC, DVD APC, and CD APC.

The RF signal processor 240 includes an RF controller 242 to generate the RF signal for the RF data processing operation, and a servo controller 244 to generate the servo control signal for the servo control operation.

Figure 3:
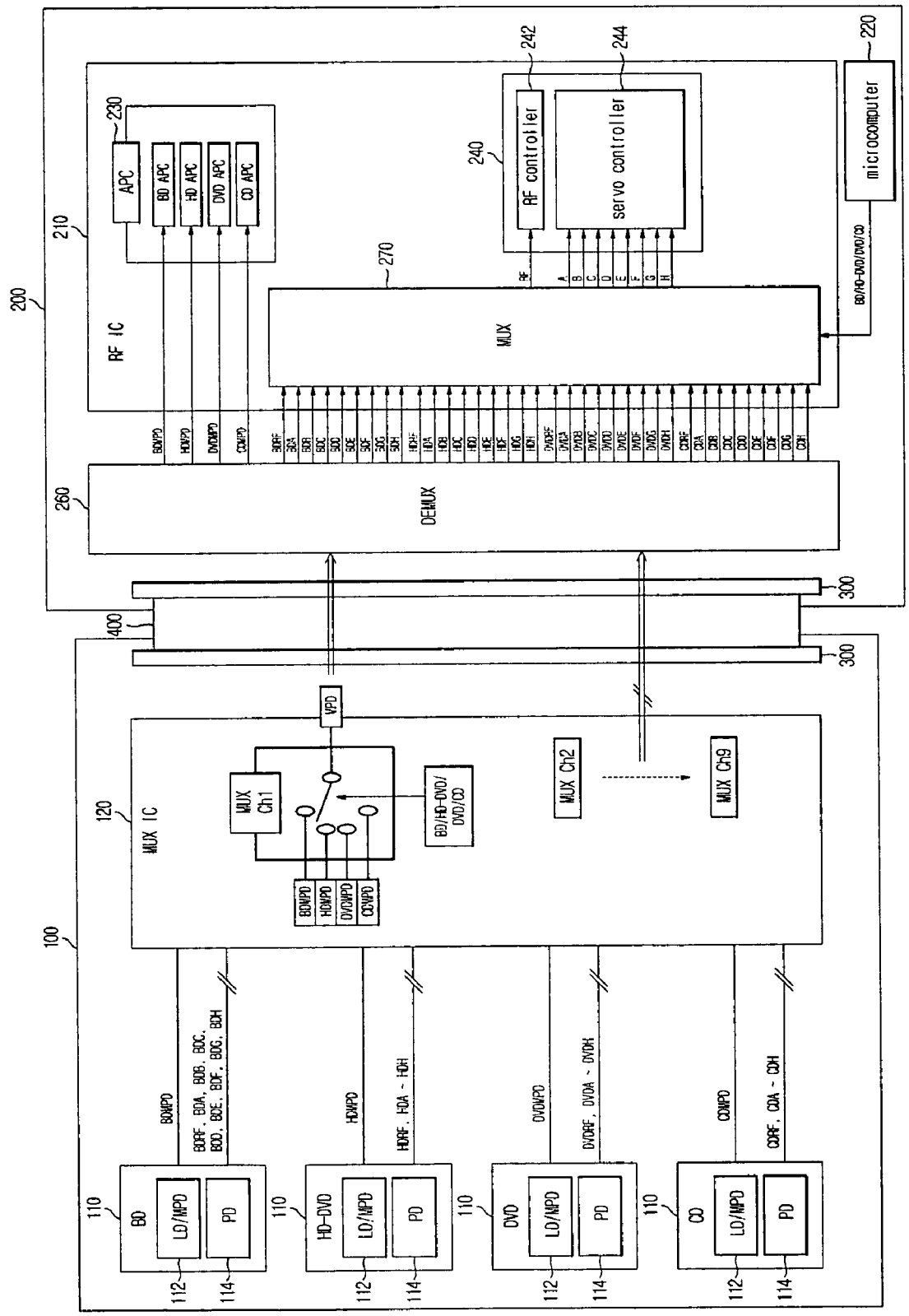
FIG. 3 is a block diagram showing the circuit configuration of an interface device for an optical recording and/or reproducing apparatus according to another embodiment of the present invention.

FIG. 3 is a block diagram showing the circuit configuration of an interface device for an optical recording and/or reproducing apparatus according to another embodiment of the present invention. Some parts in FIG. 3 are the same as those in FIG. 2. Therefore, the same elements are denoted by the same reference numerals and names, and a repeated description thereof will be omitted.

As shown in FIG. 3, the main PCB 200 includes the RF IC 210, the microcomputer 220, and a DEMUX 260. It is noted that the DEMUX 260 is provided on the main PCB 200 rather than in the RF IC 210 in a different manner from that of the DEMUX 250 in FIG. 2.

The DEMUX 260 receives the MPD signal of the particular disc 110 from the MUX IC 120, selects one of a plurality of output terminals thereof for selection of the particular disc 110, and outputs the MPD signal to a corresponding APC of the APC unit 230. The DEMUX 260 also receives the outputs of the respective PD units 114 for the discs 110, selects the PD signal corresponding to the particular disc 110, and outputs the PD signal to a MUX 270 provided in the RF IC 210.

In addition, the RF IC 210 includes the MUX 270 which selects the PD signal of the particular disc 110 among the PD signals outputted from the DEMUX 260 in a different manner from the DEMUX 250 in FIG. 2. This PD signal selected by the MUX 270 is inputted to the RF signal processor 240 and is used for the servo control operation and the RF data processing operation of the particular disc 110.

A description will hereinafter be given of the operation of the interface device for the optical recording and/or reproducing apparatus with the above-stated configuration according to the present invention.

An aspect of the present invention aims to simplify the configuration of the interface circuit between the pickup 100 to read and write disc information and the RF IC 210 for RF signal processing in a universal optical recording and/or reproducing apparatus which is capable of reading and writing information from/on all kinds of optical discs including at least one of a BD, HD-DVD, DVD, and CD. The operation of this interface configuration will hereinafter be described with reference to FIG. 2.

First, the user opens a disc tray, inserts a disc 110 of at least one of a BD, HD-DVD, DVD, or CD type into the disc tray, and closes the disc tray. Then, the microcomputer 220 loads the inserted disc 110, identifies the type thereof, and drives an LD corresponding to the inserted disc 110 of the identified type.

As the LD is driven, a corresponding PD unit 114 receives a laser signal reflected from the inserted disc 110 and generates a PD signal corresponding to at least one of a BD, HD-DVD, DVD, or CD, depending upon the determination of the type of the inserted disc 110.

The MUX IC 120 provided in the pickup 100 selects the PD signal of the inserted disc 110 from among respective outputs of the BD, HD-DVD, DVD, and CD PD units 114 in response to a switch control signal from the microcomputer 220. The PD signal selected by the MUX IC 120 is outputted through the connectors 300 to the RF IC 210 placed in the main PCB 200.

Accordingly, reduction of a number of pins of the connectors 300 from the pickup 100 to the main PCB 200 is possible by placing the MUX IC 120, which selects input/output signals of the pickup 100 and RF IC 210, in the pickup 100.

Also a reduction of a size of the RF IC 210 for RF signal processing is possible by reducing the number of input/output pins thereof. In addition, a simplification of an assembly between the pickup 100 and the main PCB 200 is possible.

Afterwards, an MPD signal inputted from the pickup 100 to the RF IC 210 is switched through the DEMUX 250 according to the type of the inserted disc 110, and fed to a corresponding APC of the APC unit 230, which then performs an APC operation to control the amount of output light from the LD corresponding to the inserted disc 110.

In the APC operation, if the amount of the output light of the LD, set to a predetermined value, is altered with a change in voltage or temperature of the LD, the APC unit 230 in the RF IC 210 detects a variation in output current of the associated MPD of the pickup 100 to maintain an amount of the output light of the LD.

The PD signal, inputted to the RF IC 210 from the pickup 100, is converted by the RF signal processor 240 in the RF IC 210 into a servo control signal and an RF signal necessary to be used in accordance with the determined type of the inserted disc 110, and is then used for a servo control operation and an RF data processing operation for the inserted disc 100.

The second embodiment of FIG. 3 has the same configuration as that of the first embodiment of FIG. 2, except that the DEMUX 260 is placed on the main PCB 200 not in the RF IC 210 and the MUX 270 is disposed between the DEMUX 260 and the RF signal processor 240. This arrangement may be changed by the designer.

With the configuration of FIG. 3 in which the MUX IC 120, which selects input/output signals of the pickup 100 and the RF IC 210, is placed within the pickup 100, a reduction of a number of pins of the connectors 300 from the pickup 100 to the main PCB 200 is also possible.

As is apparent from the above description, the present invention provides an interface device for an optical recording and/or reproducing apparatus, wherein a multiplexer MUX is provided in a pickup and adapted to multiplex input/output signals of the pickup and an RF IC. Thus, the number of pins of connectors from the pickup to the RF IC may be reduced so as to lead to advantages in that PCB layout is relatively simplified and signal quality is relatively preserved.

In addition, the interface device according to the present invention has another advantage of reducing the size and cost of the optical recording and/or reproducing apparatus by decreasing the number of input/output pins of the RF IC.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An interface device for an optical recording and/or reproducing apparatus, comprising:
    a pickup to drive a plurality of laser diodes generating laser signals to record and/or reproduce information on a plurality of discs, and to receive the laser signals reflected from the discs and output photodiode (PD) signals corresponding respectively to the received laser signals;
    an integrated circuit to control outputs of the laser diodes, and to process the PD signals from the pickup; and
    a multiplexer, disposed in the pickup, to select a PD signal corresponding to a particular one of the discs from among the PD signals from the pickup and to interface the selected particular PD signal to the integrated circuit, wherein the selected particular PD signal includes data read from the particular disc to be reproduced by the optical recording and/or reproducing apparatus.

2. The interface device as set forth in claim 1, wherein the discs are of different types.

3. The interface device as set forth in claim 2, wherein the laser diodes correspond to the discs, respectively.

4. The interface device as set forth in claim 2, wherein the laser diodes generate the laser signals depending upon determined types of the discs, respectively, and the laser signals correspond to the discs, respectively.

5. The interface device as set forth in claim 4, wherein the particular disc is any one of a Blu-ray disc (BD), digital versatile disc (DVD), high definition-DVD (HD-DVD), and compact disc (CD).

6. The interface device as set forth in claim 1, wherein the multiplexer comprises a plurality of multiplexing channels which are selectively operated to multiplex output signals of monitor photodiodes (MPDs) attached to the respective laser diodes for the discs to output an output signal of an MPD signal corresponding to the particular disc.

7. The interface device as set forth in claim 1, wherein the integrated circuit is a radio frequency (RF) integrated circuit (IC) which converts the particular PD signal among the PD signals from the pickup into a servo control signal and an RF signal necessary to the particular disc and performs a servo control operation and an RF data processing operation for the particular disc respectively, according to the converted servo control signal and the RF signal.

8. The interface device as set forth in claim 7, wherein the RF IC is provided on a main printed circuit board (PCB) and connected to the pickup through connectors.

9. The interface device as set forth in claim 8, wherein a microcomputer is mounted on the main PCB, the microcomputer outputting a switch control signal to the pickup and RF IC to select a desired one of types of the discs corresponding to the particular disc.

10. An interface device for an optical recording and/or reproducing apparatus, including a pickup to read and write information from/on an optical disc, and a main printed circuit board connected to the pickup via a cable through connectors, the pickup comprising:
  laser diode driver units to drive laser diodes to output laser signals for the respective types of discs;
  photo diode units to receive the laser signals reflected from the associated discs, respectively; and
  a multiplexer having a plurality of channels, each of which selects an output signal from one of the photo diode units corresponding to an associated one of the discs, each of the channels multiplexing output signals from monitor photo diodes attached to the respective laser driver units to select an output signal from a monitor photo diode corresponding to the associated disc from among the output signals from the monitor photo diodes, and the main printed circuit board comprising:
  an RF integrated circuit to perform RF signal processing; and
  a microcomputer to output a switch control signal to the pickup and the RF integrated circuit to select a desired one of the types of the discs.

11. A device to be used with an optical recording and/or reproducing apparatus, including a pickup to read and write information from/on an optical disc, and a main printed circuit board connected to the pickup via a cable through connectors, the pickup comprising:
  laser diode driver units to drive laser diodes for the respective types of discs;
  photo diode units to receive laser signals reflected from the associated discs, respectively; and
  a multiplexer having a plurality of channels, each of which selects an output signal from one of the photo diode units corresponding to an associated one of the discs, each of the channels multiplexing output signals from monitor photo diodes attached to the respective laser driver units to select an output signal from a monitor photo diode corresponding to the associated disc from among the output signals from the monitor photo diodes.

12. The device according to claim 11, wherein the main printed circuit board comprises:
  an RF integrated circuit (RF IC) to perform RF signal processing; and
  a microcomputer to output a switch control signal to the pickup and the RE IC to select a desired one of the types of the discs.

13. The device according to claim 12, wherein the RF IC comprises:
  an Auto laser diode Power Control unit (APC unit) to control outputs of the laser diodes for the types of discs;
  an RF signal processor to convert a photo diode signal from the multiplexer into a servo control signal and an RF signal necessary to a particular disc corresponding to the photo diode signal and to perform a servo control operation and an RF data processing operation for the particular disc according to the converted servo control signal and the RF signal; and
  a demultiplexer to receive an monitor photo diode signal corresponding to the particular disc from the mulitplexer, to select one of a plurality of output terminals thereof corresponding to the particular disc in response to the switch control signal, and to output the monitor photo diode signal to a corresponding APC of the APC unit through the selected output terminal.

14. The device according to claim 13, wherein the APC unit optimally controls outputs of the respective laser diodes for the types of the discs.

15. The device according to claim 14, wherein the APC unit maintains the outputs of the laser diodes by feeding variations in the outputs of the laser diodes back thereto.

16. The device according to claim 13, wherein the APC unit comprises at least one of a BD APC, HD APC, DVD APC, and CD APC.

17. The device according to claim 13, wherein the RF signal processor comprises:
  an RF controller to generate the RE signal for the RF data processing operation; and
  a servo controller to generate the servo control signal for the servo control operation.

18. A device to be used with an optical recording and/or reproducing apparatus, including a pickup to read and write information from/on an optical disc, and a main printed circuit board connected to the pickup via a cable through connectors, the pickup comprising:
  laser diode driver units to drive laser diodes for the respective types of discs;
  photo diode units to receive laser signals reflected from the associated discs, respectively; and
  a multiplexer having a plurality of channels, each of which selects an output signal from one of the photo diode units corresponding to an associated one of the discs, each of the channels multiplexing output signals from monitor photo diodes attached to the respective laser driver units to select an output signal from a monitor photo diode corresponding to the associated disc from among the output signals from the monitor photo diodes, and the main printed circuit board comprising:

a demultiplexer to receive and output the outputted monitor photo diode signal;

an RF integrated circuit to to receive the output signal from the demulitplexer and to perform RF signal processing; and a microcomputer to output a switch control signal to the pickup and the RF integrated circuit to select a desired one of the types of the discs.

19. A method of operating a recording and/or reproducing apparatus, including a pickup and a main printed circuit board, into which a user inserts at least one type of at least one optical disc into the disc tray, and closes the disc tray, the method comprising:

identifying the type of one of the discs and driving a laser diode corresponding to the inserted disc accordingly;

receiving a laser signal reflected from the inserted disc as the laser diode is driven and generating a photo diode signal corresponding to the type of the disc;

selecting the photo diode signal of the disc from among respective outputs of set of photo diodes for each of the types of discs in response to a switch control signal; and outputting the selected photo diode signal, wherein the selecting is accomplished by the pickup.

20. The method according to claim 19, further comprising:

feeding a monitor photo diode signal to a corresponding Auto laser diode Power Control (APC) unit; and performing an APC operation to control an amount of output light from the laser diode.

21. The method according to claim 20, wherein the performing comprises:

determining whether the amount of the output light of the laser diode, being set to a predetermined value, is altered with a change in voltage or temperature of the laser diode; and detecting a variation in output current of the monitor photo diode to maintain the amount of the output light of the laser diode.

22. A device to be used with an optical recording and/or reproducing apparatus to record and playback data of an optical disc, the device comprising:

a pickup to drive a plurality of laser diodes generating laser signals to record and/or reproduce information on a plurality of discs, respectively, and to receive the laser signals reflected from the discs and output photodiode (PD) signals corresponding respectively to the received laser signals;

a radio frequency (RF) integrated circuit (IC) for signal processing to control outputs of the laser diodes, and to process the PD signals from the pickup; and a multiplexer, disposed in the pickup, to select a PD signal corresponding to a particular one of the discs from among the PD signals from the pickup and interface the selected particular PD signal to the integrated circuit, wherein the selected particular PD signal includes data read from the particular disc to be reproduced by the optical recording and/or reproducing apparatus.

* * * * *

UNITED STATES PATENT AND TRADEMARK OFFICE
CERTIFICATE OF CORRECTION

| | | |
|---|---|---|
| PATENT NO. | : 7,564,749 B2 | Page 1 of 1 |
| APPLICATION NO. | : 11/297366 | |
| DATED | : July 21, 2009 | |
| INVENTOR(S) | : Jak Heun Yang et al. | |

It is certified that error appears in the above-identified patent and that said Letters Patent is hereby corrected as shown below:

Column 8, line 14, change "RE IC" to --RF IC--;

Column 8, line 45, change "RE" to --RF--.

Signed and Sealed this

Tenth Day of November, 2009

David J. Kappos
*Director of the United States Patent and Trademark Office*